United States Patent
Schulz

(10) Patent No.: US 6,692,562 B2
(45) Date of Patent: Feb. 17, 2004

(54) PROCESS FOR MAKING PERYLENE PIGMENT COMPOSITIONS

(75) Inventor: Gregory R. Schulz, Mt. Pleasant, SC (US)

(73) Assignee: Sun Chemical Corporation, Fort Lee, NJ (US)

( * ) Notice: Subject to any disclaimer, the term of this patent is extended or adjusted under 35 U.S.C. 154(b) by 64 days.

(21) Appl. No.: 10/093,546

(22) Filed: Mar. 8, 2002

(65) Prior Publication Data

US 2003/0167971 A1 Sep. 11, 2003

(51) Int. Cl.$^7$ .................. C08K 5/00; C07D 471/22
(52) U.S. Cl. .................. 106/494; 106/498; 544/245; 546/31
(58) Field of Search .................. 8/689, 692; 106/494, 106/498; 544/245; 546/31

(56) References Cited

U.S. PATENT DOCUMENTS

| | | | |
|---|---|---|---|
| 2,473,015 A | 6/1949 | Cullinan et al. | 260/282 |
| 3,331,847 A | 7/1967 | Gerson et al. | 260/281 |
| 3,673,192 A * | 6/1972 | Ploeg et al. | 546/37 |
| 4,336,383 A | 6/1982 | Vorozhtsov et al. | 546/52 |
| 4,556,622 A | 12/1985 | Neumann et al. | 430/58 |
| 4,714,666 A | 12/1987 | Wiedemann et al. | 430/59 |
| 4,762,569 A | 8/1988 | Miki et al. | 106/476 |
| 4,968,571 A | 11/1990 | Gruenbaum et al. | 430/58 |
| 5,019,473 A | 5/1991 | Nguyen et al. | 430/58 |
| 5,071,482 A | 12/1991 | Dietz et al. | 106/498 |
| 5,104,918 A | 4/1992 | Bäbler | 524/90 |
| 5,248,774 A | 9/1993 | Dietz et al. | 544/125 |
| 5,508,137 A | 4/1996 | Langhals | 430/78 |
| 5,650,513 A | 7/1997 | Langhals et al. | 546/38 |
| 5,958,129 A | 9/1999 | Urban et al. | 106/498 |
| 6,015,458 A | 1/2000 | Schulz et al. | 106/498 |
| 6,022,656 A | 2/2000 | Visser et al. | 430/58.65 |
| 6,039,769 A | 3/2000 | Schulz et al. | 8/574 |
| 6,084,099 A | 7/2000 | Hackmann et al. | 546/37 |
| 6,391,104 B1 * | 5/2002 | Schulz | 106/494 |

FOREIGN PATENT DOCUMENTS

| | | | |
|---|---|---|---|
| DE | 299 733 | 5/1992 | |
| DE | 43 27 273 A | 8/1993 | C09B/5/62 |
| WO | 00/40657 | 7/2000 | |

OTHER PUBLICATIONS

W. Herbst & K. Hunger, Industrial Organic Pigments, 2$^{nd}$ ed (New York: VCH Publishers Inc. (month unavailable)1997, pp. 9 and 476–479 Perylene and Perinone Pigments.

H. Zollinger, Color Chemistry, VCH Verlagsgessellschaft, (month unavailable) 1991, pp. 227–228 and 296–298, Syntheses, Properties and Applications of Organic Dyes and Pigments.

M.A. Perkins, "Pyridines and Pyridones" in The Chemistry of Synthetic Dyes and Pigments, ed H.A. Lubs(Malabar, Florida: Robert E. Krieger Publishing Company, (month unavailable) 1955, pp. 481–482.

K. Merkle and H. Schäfer, "Surface Treatment of Organic Pigments" in Pigment Handbook, vol. III (New York: John Wiley & Sons, Inc. (month unavailable) 1973, pp. 157–167.

R.B. McKay, "The Development of Organic Pigments with Particular Reference to Physical Form and Consequent Behaviour in Use" in Rev. Prog. Coloration, 10, pp. 25–32, (month unavailable) 1979.

R.B. McKay, "Control of the application performance of classical organic pigments", in JOCCA, (month unavailable) 1989, pp. 89–93.

(List continued on next page.)

Primary Examiner—Mukund J. Shah
Assistant Examiner—Thomas McKenzie
(74) Attorney, Agent, or Firm—Sidney Persley

(57) ABSTRACT

This invention relates to a process of preparing a perylene pigment compositions containing a reactive co-precipitated blend of (1) about 75 to about 99.9 mol %, relative to the pigment composition, of a compound having the formula (I)

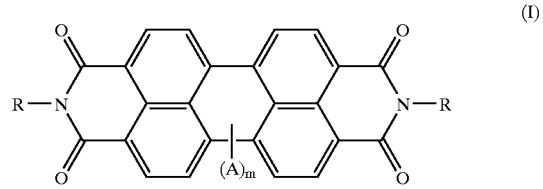

(I)

wherein
R is hydrogen, $C_1$–$C_6$ alkyl, $C_5$–$C_8$ cycloalkyl, $C_7$–$C_{16}$ aralkyl, or $C_6$–$C_{10}$ aryl,
A is $C_1$–$C_6$ alkyl, $C_1$–$C_6$ alkoxy, a sulfonyl group, amino, ammonium, hydroxy, nitro, or halogen, and
m is zero or a number from 1 to 8; and (2) about 0.1 to about 25 mol %, relative to the pigment composition, of a perylene dicarboxamidine imide having the formula (II)

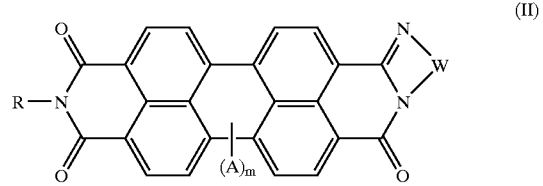

(II)

wherein
W is optionally substituted or modified $C_2$–$C_3$ alkylene.

13 Claims, No Drawings

OTHER PUBLICATIONS

T. Deligerorgiev, D. Zaneva, I. Petkov, "Synthesis and Properties of Fluorescent Bis–Quatemized Perylene Dyes" in Dyes and Pigments, 24, pp. 75–81 (month unavailable) 1994.

H. Langhals, Harald Jaschke, Ulrike Ring and Petra von Unold, "Imidazoleperylenimide–ein stark fluoreszierender, stabiler Ersatz für Terrylen" in Angew. Chem., 111, pp. 143–144 (month unavailable) 1999.

Heinz Langhals, "Novel Dyes for Electrophotographic Process with Perylene Structure Element" in IS&T's Tenth International Congress on Advance in Non–Impact Printing Technologies, pp. 192–195, (month unavailable) 1994.

Yukinori Nagao, "Synthesis and properties of perylene pigments" in Progress in Organic Coatings, 31, pp. 43–49, (month unavailable), 1997.

Heribert Quante, Yves Geerts and Klause Mullen, "Synthesis of Soluble Perylenebisamidine Derivatives. Novel Long–Wavelength Absorbing and Fluorescent Dyes" in Chem. Mater., 9, pp. 495–500, (month unavailable) 1997.

H. Langhals, "Novel Perylene Derivatives as Highly Photostable Fluorescent Dyes" in Chimia, 48, pp. 503–504 (month unavailable) 1994.

G. Tamizhmani, J. P. Dodelet, R. Côté and D. Gravel, "Photoelectrochemical Characterization of Thin Films of Perylenetracarboxylic Acid Derivatives" in Chem. Mater., 3, pp. 1046–1053, (month unavailable) 1991.

Yukinori Nagao, Narumi Ishikawa, Yoriko Tanabe & Takahisa Misono, "Synthesis of Unsymmetrical Perylenebis(discarboximde) Derivatives" in Chemistry Letters, pp. 151–154, (month unavailable) 1979.

K. Venkataraman et al, "Anthraquinonoid Vat Dyes" in Chemistry of Synthetic Dyes ed. 5, (New York Academic Press, (month unavailable) 1971, vol. V, ed. K. Venkataraman, p. 233.

L. Feiler, H. Langhals and Kurt Polborn "Synthesis of Perylene–3,4–dicarboximides—Novel Highly Photostable Fluroscent Dyes" in Liebigs Ann., pp. 1229–1244, (month unavailable) 1995.

* cited by examiner

PROCESS FOR MAKING PERYLENE PIGMENT COMPOSITIONS

BACKGROUND OF THE INVENTION

This invention relates to a process for making perylene pigment compositions containing, in addition to a perylene pigment component, certain asymmetric perylene dicarboxamidine imides that can serve as crystal growth inhibitors during the preparation of the pigment compositions.

Perylenes, including diimides of perylene-3,4,9,10-tetracarboxylic acid, can be prepared by methods known in the art. E.g., W. Herbst and K. Hunger, *Industrial Organic Pigments*, 2nd ed. (New York: VCH Publishers, Inc., 1997), pages 9 and 476–479; H. Zollinger, *Color Chemistry* (VCH Verlagsgessellschaft, 1991), pages 227–228 and 297–298; and M. A. Perkins, "Pyridines and Pyridones" in *The Chemistry of Synthetic Dyes and Pigments*, ed. H. A. Lubs (Malabar, Fla.: Robert E. Krieger Publishing Company, 1955), pages 481–482. However, perylenes as initially isolated, often referred to as crude perylenes, are generally unsuitable for use as pigments and thus must be subjected to one or more additional finishing steps that modify particle size, particle shape, and/or crystal structure in such a way that provides good pigmentary quality. See, for example, K. Merkle and H. Schafer, "Surface Treatment of Organic Pigments" in *Pigment Handbook*, Vol. III (New York: John Wiley & Sons, Inc., 1973), page 157; R. B. McKay, "The Development of Organic Pigments with Particular Reference to Physical Form and Consequent Behavior in Use" in *Rev. Prog. Coloration*, 10, 25–32 (1979); and R. B. McKay, "Control of the application performance of classical organic pigments" in *JOCCA*, 89–93 (1989).

Perylene diimides in which at least one of the imide groups is derived from a diamine that does not further react to form a dicarboxamidine imide are known. E.g., U.S. Pat. Nos. 5,958,129 and 5,248,774; European Patent Application EP 283,436; and T. Deligeorgiev et al, "Synthesis and Properties of Fluorescent Bis-Quaternized Perylene Dyes" in *Dyes and Pigments*, 24, 75–81 (1994).

Symmetric perylenes in which both of the imide groups are in the form of a dicarboxamidine have been reported. E.g., U.S. Pat. Nos. 4,556,622 and 2,473,015. These patents do not describe asymmetric perylene diimides in which only one of the imide groups is in the form of a dicarboxamidine.

Asymmetric perylene diimides in which one of the imide groups is in the form of a dicarboxamidine group have been reported but are not described as being used in admixture with perylene pigments. E.g., U.S. Pat. Nos. 5,508,137 and 4,714,666; German Patentschrift DD 299,733; H. Langhals et al, "Imidazoleperylenimide—ein starck flureszierender, stabiler Ersatz für Terrylen" in *Angew. Chem.*, 111, 143–144 (1999); "Novel Dyes for Electrophotographic Processes with Perylene Structure Element" in *IS&T's Tenth International Congress on Advances in Non-Impact Printing Technologies*, 192–195 (1994); Y. Nagao, "Synthesis and properties of perylene pigments" in *Progress in Organic Chemistry*, 31, 43–49 (1997); H. Quante et al, "Synthesis of Soluble Perylenebisamidine Derivatives. Novel Long-Wavelength Absorbing and Fluorescent Dyes" in *Chem. Mater.*, 9, 495–500 (1997); H. Langhals, "Novel Perylene Derivatives as Highly Photostable Fluorescent Dyes" in *Chimia*, 48, 503–505 (1994); G. Tamizhmani et al, "Photoelectrochemical Characterization of Thin Films of Perylenetetracarboxylic Acid Derivatives" in *Chem. Mater.*, 3, 1046–1053 (1991); Y. Nagao et al, "Synthesis of Unsymmetrical Perylenebis(dicarboxamide) Derivatives" in *Chemistry Letters*, 151–154 (1979); K. Venkataraman et al, "Anthraquinoid Vat Dyes" in *Chemistry of Synthetic Dyes*, ed. K. Venkataraman, 5 (New York: Academic Press, 1971), page 233. Some of the compounds have been prepared by unrelated synthetic methods. E.g., U.S. Pat. No. 4,336,383.

Perylene dicarboxamidines derived from perylene dicarboxylic compounds rather than perylene tetracarboxylic compounds are also known but have not been described as being used in admixture with perylene pigments. E.g., U.S. Pat. No. 5,650,513 and L. Feiler et al, "Synthesis of Perylene-3,4-dicarboximides—Novel Highly Photostable Fluorescent Dyes" in *Liebigs Ann.*, 1229–1244 (1995).

Perylene dicarboxamidine hydrazamides are known and have been described as being used in admixture with perylene pigments. See PCT application WO 00/40657. However, the hydrazamide moiety is structurally different from the imide moiety of the perylene dicarboxamidine imides of the present invention, and the PCT application does not disclose the preparation of co-precipitated blends of perylene diimides and perylene dicarboxamidine hydrazamides.

Compositions containing mixtures of perylene diimides and perylene dicarboxamidine imides are known. For example, U.S. Pat. Nos. 6,022,656, 5,019,473, and 4,968,571 describe blending the separately prepared components in polymeric binders for use in electrophotographic elements and U.S. Pat. No. 4,762,569 describes dispersing the separately prepared components non-aqueous paints or inks. None of these patents describes the preparation of co-precipitated blends of perylene diimides and perylene dicarboxamidine imides having small particle sizes of uniform particle size distribution.

In copending application Ser. No. 09/729,257 it has been disclosed that reactive co-precipitation of perylene pigments with certain asymmetric perylene dicarboxamidine imides provides pigment compositions having small-sized crystals that exhibit improved transparency and color properties, even in the unfinished form that is initially isolated without further physical manipulation to modify crystal size. A process for making these co-precipitated perylene pigments has been described.

An improved process for making these co-precipitated perylene pigments has now been found.

SUMMARY OF THE INVENTION

This invention relates to a process for the preparation of perylene pigment compositions comprising forming the perylene dicarboxamidine imide structure by (A) reacting
  (1) a perylene tetracarboxylic acid compound of formula (I)

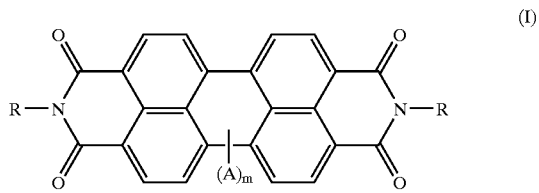

wherein
  R is hydrogen, $C_1$–$C_6$ alkyl, $C_5$–$C_8$ cycloalkyl, $C_7$–$C_{16}$ aralkyl, or $C_6$–$C_{10}$ aryl, A is $C_1$–$C_6$ alkyl, $C_1$–$C_6$ alkoxy, a sulfonyl group, amino, ammonium, hydroxy, nitro, or halogen, and m is zero or a number from 1 to 8

(2) about 0.1 to about 25 mol % (preferably 0.5 to 10 mol %), based on the total amount of component (A)(i) of a perylene dicarboxamidine imide of formula (II),

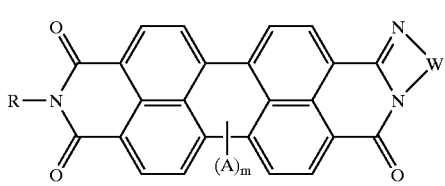

(II)

wherein

W is $C_2$–$C_3$ alkylene that is optionally substituted or modified, (3) an alkylating agent of formula (V) or (VI)

$R^1$—X (V)

$R^1$—Y—$R^1$ (VI)

wherein $R^1$ is $C_1$–$C_6$ alkyl, $C_5$–$C_8$ cycloalkyl, $C_7$–$C_{16}$ aralkyl, or $C_6$–$C_{10}$ aryl, X is a halogen, and Y is sulfate (i.e., O—S(=O)$_2$—O) or carbonate (i.e., O—C(=O)—O), and (4) optionally, a solvent;

thereby forming a perylene pigment composition as a reactive co-precipitated blend; and (B) isolating the perylene pigment composition.

The invention also relates to a process of preparing the perylene of formula (II) comprising (C) reacting

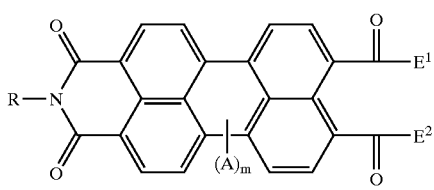

(III)

(i) a perylene tetracarboxylic compound having the formula (III) wherein $E^1$ and $E^2$ are independently OR or together are O, each R is independently H (i.e., for carboxylic acids), $C_1$–$C_6$ alkyl or $C_5$–$C_8$ cycloalkyl (i.e., for alkyl esters), $C_7$–$C_{16}$ aralkyl (i.e., for aralkyl esters), or $C_6$–$C_{10}$ aryl (i.e., for aryl esters), (ii) about 100 to 300 mol % (preferably 150 to 300 mol %) based on the total amount of (C)(i) of a diamine having the formula (IV), $H_2N$—W—$NH_2$ (IV)

wherein W is $C_2$–$C_3$ alkylene that is optionally substituted or modified, and (iii) optionally, a solvent; and (D) isolating the perylene dicarboxamidine imide.

DETAILED DESCRIPTION OF THE INVENTION

Perylene tetracarboxylic compounds that can be used according to this invention, some of which are crude or conditioned perylene pigments and some of which are precursors of perylene pigment, can be prepared by any of various methods known in the art. E.g., W. Herbst and K. Hunger, *Industrial Organic Pigments*, 2nd ed. (New York: VCH Publishers, Inc., 1997), pages 9 and 476–479; H. Zollinger, *Color Chemistry* (VCH Verlagsgessellschaft, 1991), pages 227–228; M. A. Perkins, "Pyridines and Pyridones" in *The Chemistry of Synthetic Dyes and Pigments*, ed. H. A. Lubs (Malabar, Fla.: Robert E. Krieger Publishing Company, 1955), pages 481–482; and F. Graser, "Perylenes" in *Pigment Handbook*, 2nd edition, Vol. III (New York: John Wiley & Sons, Inc., 1988), pages 653–658.

As used herein, the term "$C_2$–$C_3$ alkylene" refers to optionally substituted or modified 1,2-ethylene or 1,3-propylene groups that, when referring to the perylene dicarboxamidine imides of formula (II), are attached to two nitrogen atoms to form the indicated heterocyclic ring and, when referring to the diamine reactants of formula (IV), are attached to two $NH_2$ groups.

Substituted $C_2$–$C_3$ alkylene groups are those in which one or more of the ethylene or propylene carbon atoms are each substituted with one or two $C_1$–$C_6$ alkyl (preferably methyl), $C_1$–$C_6$ alkoxy, $C_5$–$C_8$ cycloalkyl, $C_7$–$C_{16}$ aralkyl, $C_6$–$C_{10}$ aryl (preferably phenyl), or halogen group or with one sulfonyl, amino, ammonium, hydroxy, or nitro group; in which one or more of the ethylene or propylene carbon atoms is gem-disubstituted with a $C_3$–$C_7$ alkylene group to form a geminal ring system having 4 to 8 ring carbon atoms; or in which adjacent carbon atoms are part of a fused-on ring system. The term "fused-on ring systems" refers to ethylene or propylene groups in which two adjacent carbon atoms are substituted with groups that together form a fused-on hydrocarbon ring, including a cycloalkane ring or, more preferably, an aromatic ring system such as benzene or 1,2- or 2,3-naphthalene or refers to a propylene group in which all three carbon atoms are substituted with groups that together form a fused-on multiple hydrocarbon ring (most preferably a polyaromatic ring system such as 1,8-naphthalene). Each of the geminal or fused-on ring systems can be ring-substituted, for example, with $C_1$–$C_6$ alkyl, $C_7$–$C_{16}$ aralkyl, $C_6$–$C_{10}$ aryl, $C_1$–$C_6$ alkoxy, sulfonyl, amino, ammonium, and halogen groups such as described above.

Modified $C_2$–$C_3$ alkylene groups are those in which one or more of the carbon atoms is replaced with O, S, or $NR^a$ (wherein $R^a$ is hydrogen or $C_1$–$C_6$ alkyl). An example of a diamine based on a modified alkylene group of this type is diaminoguanidine.

Preferred $C_2$–$C_3$ alkylene groups include unsubstituted and unmodified 1,3-propylene or 1,3-propylene in which one or more carbon atoms are each substituted with one or two $C_1$–$C_6$ alkyl groups.

The term "$C_1$–$C_6$ alkyl" refers to aliphatic hydrocarbon groups having from 1 to 6 carbon atoms. Examples of $C_1$–$C_6$ alkyl are methyl, ethyl, propyl, butyl, pentyl, hexyl, and the isomeric forms thereof. The term "$C_5$–$C_8$ cycloalkyl" refers to cycloaliphatic hydrocarbon groups having from 5 to 8 carbon atoms. Examples of $C_5$–$C_8$ cycloalkyl are cyclopentyl, cyclohexyl, cycloheptyl, and cyclooctyl. The term "$C_6$–$C_{10}$ aryl" refers to phenyl and 1- or 2-naphthyl. The term "$C_7$–$C_{16}$ aralkyl" refers to $C_1$–$C_6$ alkyl substituted with $C_6$–$C_{10}$ aryl such that the total number of carbon atoms is from 7 to 16. Examples of $C_7$–$C_{16}$ aralkyl are benzyl, phenethyl, and naphthylmethyl. These alkyl, cycloalkyl, aryl, and aralkyl groups can be substituted at one or more carbon atoms with $C_1$–$C_6$ alkyl (which, if the primary group is alkyl, can create a branched or long-chain alkyl group), $C_1$–$C_6$ alkoxy, $C_7$–$C_{16}$ aralkyl, $C_7$–$C_{16}$ aralkoxy, $C_6$–$C_{10}$ aryl, $C_6$–$C_{10}$ aryloxy, amino (such as amino substituted with one or more $C_1$–$C_6$ alkyl, $C_7$–$C_{16}$ aralkyl, and/or $C_6$–$C_{10}$ aryl groups), halogen, hydroxy (including tautomeric oxo forms), alkoxycarbonyl, aryloxycarbonyl, cyano, and nitro groups. Aromatic rings of aryl and aralkyl groups can also be substituted with groups, such as aryl-N=N— groups, that are typically not stable when attached to aliphatic carbon atoms. The term "$C_1$–$C_6$ alkoxy" refers to straight or branched chain alkyl oxy groups having from 1 to 6 carbon atoms. Examples of $C_1$–$C_6$ alkoxy are methoxy, ethoxy, propoxy, butoxy, pentyloxy, hexyloxy, and the isomeric forms thereof. The term "$C_7$–$C_{16}$ aralkoxy" refers to $C_1$–$C_6$ alkoxy substituted with $C_6$–$C_{10}$ aryl such that the total number of carbon atoms is from 7 to 16. An example of $C_7$–$C_{16}$ aralkoxy is benzyloxy. The term "$C_6$–$C_{10}$ aryloxy" refers to phenoxy and 1- or 2-naphthoxy, in which the aromatic portion can optionally be substituted as described above for aryl groups. The term "sulfonyl group" refers to —$SO_2$-$R^i$ groups, such as alkylsulfonyl (in which $R^i$ is alkyl; for example, methanesulfonyl or ethanesulfonyl), arylsulfonyl (in which $R^i$ is aryl; for example, benzenesulfonyl, 1- or 2-naphthalenesulfonyl, and substituted forms such as toluenesulfonyl), sulfoxyl and corresponding esters (in which $R^i$ is OH, alkoxy, cycloalkoxy, aralkoxy, aryloxy), and sulfonamides (in which $R^i$ is —$NR^{ii}R^{iii}$, wherein $R^{ii}$ and $R^{iii}$ are independently hydrogen, alkyl, cycloalkyl, aralkyl, or aryl). The terms "amino" and "ammonium" refer respectively to —$NR^{iv}R^v$ and —$NR_iv R^v R^{vi+}$ in which $R^{iv}$, $R^v$, and $R^{vi}$ are independently hydrogen, $C_1$–$C_6$ alkyl, or $C_7$–$C_{16}$ aralkyl and each ammonium group is electrically balanced with a stoichiometric amount of an anion. The term "halogen" includes fluorine, chlorine, bromine, and iodine.

The term "alkylating agent" refers to any electrophile capable of transferring $C_1$–$C_6$ alkyl, $C_5$–$C_8$ cycloalkyl, $C_7$–$C_{16}$ aralkyl, or $C_6$–$C_{10}$ aryl groups to the perylene imide nitrogen. Suitable alkylating agents consist of $C_1$–$C_6$ alkyl, $C_5$–$C_8$ cycloalkyl, $C_7$–$C_{16}$ aralkyl, or $C_6$–$C_{10}$ aryl halides, sulfates, and carbonates.

Perylene tetracarboxylic compounds that can be used as starting materials (A)(1) for the preparation of pigmentary perylene compositions according to the invention include various tetracarboximides of formula (I) where R is hydrogen. Suitable but generally less preferred are tetracarboximides where R is $C_1$–$C_6$ alkyl, $C_5$–$C_8$ cycloalkyl, $C_7$–$C_{16}$ aralkyl, or $C_6$–$C_{10}$ aryl. Most preferable are dicarboximides of formula (I) wherein both substituents R are hydrogen.

Some of the perylene tetracarboxylic compounds used as component (A)(1) can themselves be pigments but it is not necessary for these compounds to be pigments as long as the ultimate perylene pigment composition is pigmentary.

Perylene tetracarboxylic compounds that can be used as starting materials (C)(i) for the preparation of perylene dicarboxamidine imide compositions used in the invention include various carboxylic esters or the cyclic anhydride of formula (III). Preferred perylene tetracarboxylic compounds are anhydride of formula (III) in which $E^1$ and $E^2$ together are an oxygen atom and R is hydrogen, which corresponds to compounds having the formula (IIIa)

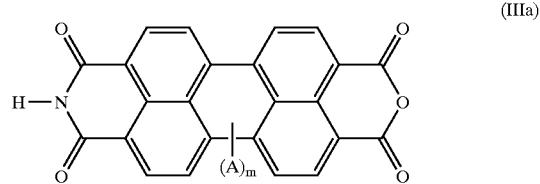

wherein A and m are defined as above for formula (III). Particularly preferred perylene imide anhydrides have no aromatic ring substituents A (i.e., m is zero), but substituted perylene imide anhydrides in which at least one of the eight substitutable aromatic ring carbon atoms of the perylene moiety has at least one group A (i.e., where m is not zero) are also suitable. Suitable but generally less preferred perylene imide dicarboxylic compounds in which R is $C_1$–$C_6$ alkyl, $C_5$–$C_8$ cycloalkyl, $C_7$–$C_{16}$ aralkyl, or $C_6$–$C_{10}$ aryl. Also, generally less preferred perylene imide dicarboxylic compounds include esters in which groups $E^1$ and $E^2$ are independently hydroxyl, $C_1$–$C_6$ alkoxy, $C_7$–$C_{16}$ aralkoxy, or $C_6$–$C_{10}$ aryloxy (preferably dicarboxylic esters in which $E^1$ and $E^2$ are identically alkoxy), particularly those having no aromatic ring substituents A (i.e., m is zero).

Some of the perylene tetracarboxylic compounds used as component (C)(i) can themselves be pigments but it is not necessary for these compounds to be pigments as long as the ultimate perylene pigment composition is pigmentary.

In step (C), a perylene tetracarboxylic compound of formula (III) is allowed to react with a diamine having the formula (IV) in amounts such that all of (III) is converted to the asymmetric perylene dicarboxamidine imide of formula (II), wherein R, A, m, and W are as defined above.

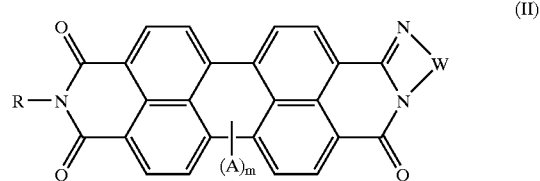

This can be achieved by using a molar excess, about 100 to 300 mol %, of the diamine relative to the total amount of the perylene tetracarboxylic compound.

Suitable diamines are compounds of formula (IV)

$$H_2N—W—NH_2 \quad (IV)$$

in which W represents an optionally substituted or modified 1,2-ethylene or 1,3-propylene group. The ultimately formed asymmetric perylene dicarboxamidine imide of formula (II) will have a five-membered heterocyclic group if 1,2-diaminoethane or a derivative thereof is used in step (C) or a six-membered heterocyclic group if 1,3-diaminopropane or a derivative thereof is used. Particularly preferred diamines are unsubstituted and unmodified 1,3-diaminopropane or 1,3-diaminopropane substituted in the 2-position with one or two $C_1$–$C_6$ alkyl (preferably methyl) groups or a hydroxy group. Examples of suitable diaminopropanes include 1,3-diaminopropane, 2-methyl-1,3-diaminopropane, 2,2-dimethyl-1,3-diaminopropane, 1,3-diamino-2-hydroxypropane, and the like. Examples of suitable diaminoethanes include 1,2-diaminoethane, 1,2-diaminopropane, 1,2-diaminobutane, and the like. Although generally not preferred, it is possible to choose diamines in which substituents on group W can be converted to other substituents during or after step (B) or (D) or any subsequent step that is carried out.

It is necessary to use at least a slight excess of diamine relative to the anhydride or ester groups of the component of formula (III) in step (C)(i). The theoretical amount of diamine required to complete the desired reaction can be calculated to account for the amount of anhydride or ester groups available. Generally, it is necessary to use about 1 mole to about 3 moles of diamine per mol of (III) in (C)(i); however, it is generally preferred to use larger quantities of diamine, which could serve as solvent or as co-solvent if it is a liquid under the reaction conditions. A large excess of diamine assures formation of the perylene dicarboxamidine imide structure (II), whereas smaller amounts of diamine could result in formation of dimers shown as formula (VII).

It is also possible to add mineral acids or other catalysts at lower levels such that at least one mole of unprotonated amine moiety remains in (IV) per mole of (C)(i). This mineral acid facilitates the formation of the dicarboxamidine and reduces the likelihood of dimer formation.

This resulting perylene dicarboxamidine imide compound is combined in step (A) with a perylene tetracarboxylic compound of formula (I) in amounts between about 0.1 to about 25 mol % (preferably 0.5 to 10 mol %) relative to the total amount of the perylene tetracarboxylic compound, in the presence of an alkylating agent.

Steps (A) and (C) are generally carried out at a temperature of about 50° C. to about 150° C., preferably for about two to about fifteen hours, more preferably about four to about seven hours.

Steps (A) and (C) are typically, although not necessarily, carried out in a solvent. Suitable solvents used in steps (A)(1) and (C)(iii) are liquids that are capable of dissolving or suspending the components of the reaction mixture without significantly decomposing or otherwise reacting during the reaction. Examples of suitable solvents include water; monofunctional alcohols, particularly lower alkanols such as methanol, ethanol, butanol, pentanol, hexanol, and isomeric forms thereof; amides such as dimethylformamide and dimethylacetamide; ethers such as tetrahydrofuran and dioxane; alkylene glycols and thioglycols such as ethylene glycol, propylene glycol, butylene glycol, triethylene glycol, hexylene glycol, diethylene glycol, and thiodiglycol; polyalkylene glycols, such as polyethylene glycol and polypropylene glycol; other polyols, such as glycerol and 1,2,6-hexanetriol; lower alkyl ethers of polyhydric alcohols, such as 2-methoxyethanol, 2-(2-methoxyethoxy)ethanol, 2-[2-(2-methoxyethoxy)ethoxy]ethanol, and 2-[2-(2-ethoxyethoxy)ethoxy]ethanol; aromatic and heteroaromatic liquids, such as benzene, pyridine, and quinoline; and other such organic liquids known in the art. Water is a particularly preferred solvent. Other solvents can, of course, also often be used, but it is generally advisable to avoid solvents that can react with the reactive components. The quantity of solvent is generally not critical but should be an amount sufficient to dissolve or suspend the components of the reaction mixture but not so large as to require removal of excessive amounts after the reaction is complete. Typical quantities of solvent range from about 0.5 to about 100 parts by weight (preferably 1 to 10 parts by weight) relative to the total amount of components (1), (2), and (3) in (A) or (i) and (ii) in (C).

Solvents (A)(1) and (C)(iii)may not be necessary if one or more of the components (A)(1), (A)(2), or (A)(3) or (C)(i) or (C)(ii); respectively, is a liquid or if the mixture of components can be melted without significant decomposition to undesired by-products. Solvents used in step (A) can be the same as or different from (preferably the same as) the solvents used in step (C).

Conventional additives used with perylene pigments can also be added before or during reaction steps (A) and (C). Suitable additives include, for example, surfactants, dispersants, wetting agents, defoamers, grinding aids, latices, organic pigment derivatives, organic acids, mineral acids, inorganic compounds (such as metal salts), or mixtures thereof. Examples of such optional ingredients include sulfonic acid, sulfonamide, carboxamide, aminoalkyl, or phthalimidoalkyl derivatives of organic pigments (particularly of perylenes, phthalocyanines, or quinacridones); acrylic copolymers; fatty acids having at least 12 carbon atoms (such as stearic acid or behenic acid) and corresponding amides, esters, or salts (such as magnesium stearate, zinc stearate, aluminum stearate, or magnesium behenate); quaternary ammonium compounds, such as tri[($C_1$–$C_4$ alkyl)benzyl]ammonium salts; plasticizers, such as epoxidized soya bean oil; waxes (such as polyethylene wax); resin acids (such as abietic acid, rosin soap, or hydrogenated or dimerized rosin); $C_{12}$–$C_{18}$-paraffin-disulfonic acids; sulfonated dicarboxylic acids and corresponding esters or amides thereof (such as sulfosuccinates, sulfosuccinamates, and derivatives thereof); alkyl phosphates and phosphonates; long chain fatty amines (such as laurylamine or stearylamine); polyamines (such as polyethylenimines); quaternary ammonium compounds (such as tri[($C_1$–$C_4$ alkyl)benzyl]ammonium salts); alkylphenols; alcohols and diols (such as stearyl alcohol and dodecane-1,2-diol); alkoxylated fatty acids and amides, alkoxylated alcohols, alkoxylated alkylphenols, and glycol esters; polyurethanes; or combinations thereof. Such optional ingredients can be incorporated in amounts ranging up to about 20% by weight (preferably 0.05 to 20% by weight, more preferably 1 to 10% by weight), based on the amount of the perylene tetracarboxylic starting material of formula (III). Additives used in step (A) can be the same as or different from (preferably the same as) the solvents used in step (C).

Although generally much less preferred, it is also possible to combine (C)(i), (C)(ii), and (A)(i), allowing the (C)(i) and (C)(ii) to react in the presence of (A)(i) prior to the addition of (A)(iii).

Component (A)(iii) includes alkylating agents such as organic halides, sulfates, and carbonates in which each organic group includes is $C_1$–$C_6$ alkyl (preferably methyl), $C_7$–$C_{16}$ aralkyl, or $C_6$–$C_{10}$ aryl. Examples of suitable alkyl halides include methyl, ethyl, propyl, butyl, pentyl, and hexyl fluoride, bromide, chloride, and iodide and isomeric forms thereof. Examples of aralkyl halides include benzyl and phenethyl fluoride, bromide, chloride, and iodide. Examples of aryl halides include fluoro-, bromo-, chloro-, and iodobenzene; methoxy- and ethoxybenzyl fluoride, bromide, chloride, and iodide; various isomers of fluoro-, bromo-, chloro-, and iodoxylene; and various isomers of dimethylbenzyl fluoride, chloride, bromide, and iodide. Examples of alkyl sulfates include methyl, ethyl, propyl, butyl, pentyl, and hexyl sulfate and isomeric forms thereof. Examples of aralkyl sulfates include benzyl and phenethyl sulfate. Examples of aryl sulfates include benzyl sulfate, methoxy- and ethoxybenzyl sulfate; various isomers of xylyl sulfate; and various isomers of dimethylbenzyl sulfate. Examples of alkyl carbonates include methyl, ethyl, propyl, butyl, pentyl, and hexyl carbonate and isomeric forms thereof. Examples of aralkyl carbonates include benzyl and phenethyl carbonates. Examples of aryl halides include benzyl carbonate; methoxy- and ethoxybenzyl carbonate; various isomers of xylyl carbonate; and various isomers of dimethylbenzyl carbonate. Use of a methyl halide, sulfate, or carbonate in conjunction with a perylene tetracarboxylic compound of formula (I) where R is hydrogen, for example, gives rise to a perylene pigment composition containing as the principle component N,N'-dimethylperylenetetracarboxylic diimide (Pigment Red 179, (I), R=methyl).

Regardless of the exact nature of the process that occurs, it is the formation of a co-precipitated blend of compounds of formulas (I) and (II) during step (A) that is referred to herein as "reactive co-precipitation." The resultant reactive co-precipitated perylene pigment compositions have small-sized crystals having a relatively narrow particle size distribution and can be used to prepare paints having improved coloristic properties. Compositions prepared by blending already fully alkylated perylene diimides of formula (I) and perylene dicarboxamidine imides of formula (II) would not result in a reactive co-precipitated pigment composition and therefore not exhibit the advantageous physical and color properties of compositions prepared according to the invention.

Although generally not necessary, final particle size of the pigment can thus be further controlled by varying the method of aftertreatment. For example, pigments can be made more transparent by reducing the particle size or more opaque by increasing the particle size. If desired, for example, the perylene pigment composition can be conditioned using methods known in the art, such as milling or, less preferably, solvent treatment or milling in combination with solvent treatment. Suitable milling methods include dry-milling methods such as jet milling, ball milling, and the like, with or without additives, or wet-milling methods such as salt kneading, sand milling, bead milling, and the like in water or organic solvents, with or without additives.

Use of various other optional ingredients during or after the optional conditioning step, although generally not necessary, can further improve properties of the perylene pigment compositions of the invention. Suitable optional ingredients include surfactants, dispersants, wetting agents, defoamers, grinding aids, latices, organic pigment derivatives, inorganic compounds (such as metal salts), or mixtures thereof, such as those mentioned above for use in steps (A) and (C). Such optional ingredients can be incorporated in amounts ranging up to about 20% by weight (preferably 0.05 to 20% by weight, more preferably 1 to 10% by weight), based on the amount of the organic pigment composition.

Because of their advantageous properties, the perylene pigment compositions according to the present invention are suitable for many different pigment applications. For example, pigment compositions according to the invention can be used as the colorant (or as one of two or more colorants) for very lightfast pigmented systems. Examples include pigmented mixtures with other materials, pigment formulations, paints, printing ink, colored paper, or colored macromolecular materials. The term "mixtures with other materials" is understood to include, for example, mixtures with inorganic white pigments, such as titanium dioxide (rutile) or cement, or other inorganic pigments. Examples of pigment formulations include flushed pastes with organic liquids or pastes and dispersions with water, dispersants, and, if appropriate, preservatives. Examples of paints in which pigments of this invention can be used include, for example, physically or oxidatively drying lacquers, stoving enamels, reactive paints, two-component paints, solvent- or water-based paints, emulsion paints for weatherproof coatings, and distempers. Printing inks include those known for use in paper, textile, and tinplate printing. Suitable macromolecular substances include those of a natural origin, such as rubber; those obtained by chemical modification, such as acetyl cellulose, cellulose butyrate, or viscose; or those produced synthetically, such as polymers, polyaddition products, and polycondensates. Examples of synthetically produced macromolecular substances include plastic materials, such as polyvinyl chloride, polyvinyl acetate, and polyvinyl propionate; polyolefins, such as polyethylene and polypropylene; high molecular weight polyamides; polymers and copolymers of acrylates, methacrylates, acrylonitrile, acrylamide, butadiene, or styrene; polyurethanes; and polycarbonates. The materials pigmented with the perylene pigment compositions of the present invention can have any desired shape or form. The pigment compositions according to this invention are highly water-resistant, oil-resistant, acid-resistant, lime-resistant, alkali-resistant, solvent-resistant, fast to over-lacquering, fast to overspraying, fast to sublimation, heat-resistant, and resistant to vulcanizing, yet give a very good tinctorial yield and are readily dispersible (for example, in plastic materials).

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all percentages are percentages by weight.

EXAMPLES

Examples 1–5

Examples 1 and 2 describe the preparation of perylene dicarboxamidine imide compositions. Comparison Example 3 describes the preparation of N,N'-dimethylperylenetetracarboxylic diimide (Pigment Red 179) in the absence of a perylene dicarboxamidine imide according to the invention. Examples 4 and 5 describe the preparation of N,N'-dimethylperylenetetracarboxylic diimide in the presence of a perylene dicarboxamidine imide.

Particle Size Test Methods

Particle sizes of the compositions prepared in the following examples were determined using QLS laser scattering, DCP disc centrifuge, and X-ray powder diffraction methods. For the laser scattering and disk centrifuge determinations, samples of each pigment composition were diluted in water, dispersed with an ultrasonic horn (600 W for two minutes), and further diluted. For the X-ray determinations, powder samples were used.

Laser scattering results were obtained using a Brookhaven Instruments Laser Scattering Particle Size Analyzer equipped with a BI-9000 Correlator detector using a photomultiplier tube voltage of 1.75 kV, a laser wavelength of 632.8 nm, a beam width of 1 mm (nonpolarized), a detection angle of 90°, and a cell length of 12 mm, and are reported as effective diameters ($D_{eff}$), which are similar to average or median values.

Disc centrifuge results were obtained using a Brookhaven Instruments BI-DCP 1000 Particle Sizer operating at 10,000 rpm and are reported as surface area average diameters ($D_s$), weight average diameters ($D_w$), 95% cumulative values in weight distribution ($D_{w,95}$), and polydispersity (the spread of the distribution defined as $D_w/D_n$, where $D_n$ is the number average diameter).

X-ray powder diffraction results were obtained using a Siemens D5000 X-Ray Diffractometer and are reported as full-width at half-maximum ("FWHM") for the singlet found at a diffraction angle 2θ of 8.2°.

Example 1

To 500 ml of deionized water in an autoclave was added 7 g perylene monoimide/monoanhydride and 2.6 g 2,2-dimethyl-1,3-propanediamine. The autoclave was sealed and heated with stirring at 140° C. for 14 hours. The autoclave was cooled, and the contents collected by vacuum filtration and washed free of bleed with deionized water. The filter cake was reslurried in 300 ml of deionized water and the pH of the suspension adjusted to 12 with 12% aqueous potassium hydroxide. The suspension was heated at 80° C. for two hours, cooled to 60° C., and filtered. The filter cake was washed with deionized water until free of bleed. A total of 20.5 g of filter cake was obtained, corresponding to 4.79 g (VIII).

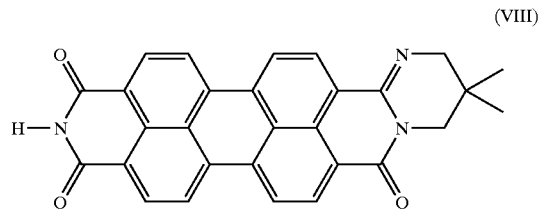

(VIII)

Example 2

To 500 ml of deionized water in an autoclave was added 10 g perylene monoimide/monoanhydride and 6.91 g 1,3-diamino-2-hydroxypropane. With stirring, a solution of 4.91 g 96% sulfuric acid in 50 mL deionized water was added. The autoclave was sealed and heated at 140° C. with stirring for 14 hours. The autoclave was cooled, and the precipitate was collected by vacuum filtration and washed with deionized water until free of

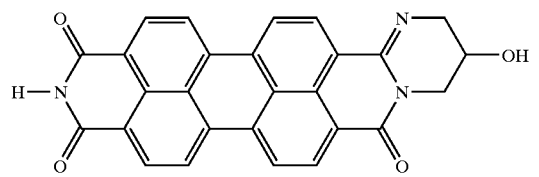

(IX)

bleed. Approximately 81 g of filter cake was obtained, corresponding to approximately 10.1 g (IX).

Example 3 (Control)

To a suspension of 100 g crude perylene diimide pigment in 876.8 g water in a 2 L autoclave was added 50.1 g of 75% phosphoric acid. To this acidified slurry was added, with stirring, an additional 173.1 g of 50% sodium hydroxide solution. The autoclave was sealed and heated to 65° C. Methyl chloride gas was introduced at a pressure of 65 psi and the mixture allowed to react until the pH of the slurry was measured to be 7.0. The methyl chloride pressure was relieved and the contents of the autoclave discharged into 458 g water. The suspension was adjusted to a pH of 2.5 with 96% sulfuric acid and the heated to 90° C. for 2 hours. The suspension was cooled, and the perylene pigment collected by vacuum filtration and washed with water until free of acid. Approximately 313 g of P.R. 179 filter cake, corresponding to approximately 72 g of dry pigment, was obtained.

Test results are shown in Table 1.

Example 4

The procedure in Example 3 was followed except that 20.5 g of perylene dimethyl dicarboxamidine imide (VIII) filter cake, corresponding to 4.79 g (VIII), was added after the addition of the 50% sodium hydroxide solution. The pH of the reaction mixture upon completion was 7.2. Approximately 338 g of pigment filter cake, corresponding to approximately 76 g of dry pigment, was obtained.

Test results are shown in Table 1.

Example 5

The procedure in Example 3 was followed except that 40.3 g of perylene hydroxy dicarboxamidine imide (IX) filter cake, corresponding to 5.0 g (IX), was added after the addition of the 50% sodium hydroxide solution. The pH of the reaction mixture upon completion was 7.5. Approximately 345 g of pigment filter cake, corresponding to approximately 76 g of dry pigment, was obtained.

Test results are shown in Table 1.

TABLE 1

| | Particle size results for Examples 3–5 | | | | | |
|---|---|---|---|---|---|---|
| | Laser scattering | Disc centrifuge | | | | X-ray |
| Example | $D_{eff}$ (nm) | $D_s$ (nm) | $D_w$ (nm) | $D_{w,95}$ (nm) | Polydispersity | diffraction FWHM |
| 3 (comp) | 209 | 126 | 177 | 344 | 2.53 | 0.375 |
| 4 | 175 | 74 | 121 | 269 | 2.69 | 0.503 |
| 5 | 194 | 80 | 123 | 262 | 2.62 | 0.463 |

The test results presented in Table 1 show that pigment compositions prepared according to the invention have smaller particles that the comparison pigment prepared in the absence of a perylene dicarboxamidine imide.

The pigment compositions produced in examples 3–5 were each finished by combining each pigment filter cake with a polyurethane oligomeric dispersant, milling the resulting slurry in a bead mill, and spray drying the final milled slurry. The resulting finished pigments were tested in a proprietary automotive waterborne basecoat/clearcoat system. Paints prepared using finished pigments based on pigment compositions produced in Examples 4 and 5 exhibit deeper and more transparent masstones, yellower and cleaner undertones (tints), and stronger, cleaner, and yellower metallics with deeper travel when compared to the paint prepared using the finished pigment based on the pigment composition produced in comparison Example 3.

What is claimed is:
1. A process for preparing a perylene pigment composition comprising
   (A) reacting
      (1) a perylene tetracarboxylic acid compound of formula (I)

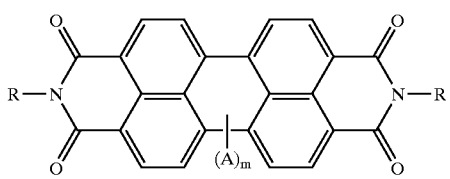

(I)

wherein
each R is independently hydrogen, $C_1$–$C_6$ alkyl, $C_5$–$C_8$ cycloalkyl, $C_7$–$C_{16}$ aralkyl, or $C_6$–$C_{10}$ aryl,
A is $C_1$–$C_6$ alkyl, $C_1$–$C_6$ alkoxy, a sulfonyl group, amino, ammonium, hydroxy, nitro, or halogen, and
m is zero or a number from 1 to 8; and
(2) about 0.1 to about 25 mol % (preferably 0.5 to 10 mol %), relative to the pigment composition of the a perylene compound of formula (II)

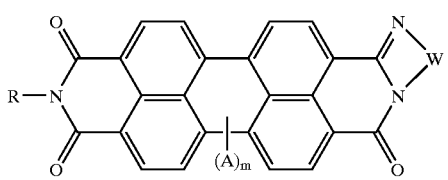

(II)

wherein
W is $C_2$–$C_3$ alkylene that is optionally substituted or modified, and
(3) an alkylating agent of formula (V) or (VI)

$R^1$—X          (V)

$R^1$—Y—$R^1$   (VI)

wherein
$R^1$ is $C_1$–$C_6$ alkyl, $C_5$–$C_8$ cycloalkyl, $C_7$–$C_{16}$ aralkyl, or $C_6$–$C_{10}$ aryl,
X is a halogen, and
Y is sulfate (i.e., O—S(=O)$_2$—O) or carbonate (i.e., O—C(=O)—O), and
(4) optionally, a solvent;
thereby forming a reactive co-precipitated perylene pigment composition; and
(B) isolating the perylene pigment composition.

2. A process according to claim 1 wherein m is zero.

3. A process according to claim 1 wherein W is 1,3-diaminopropane or 1,3-diaminopropane substituted in the 2-position with one or two $C_1$–$C_6$ alkyl groups or a hydroxy group.

4. A process according to claim 1 wherein at least one R is hydrogen.

5. A process according to claim 1 wherein both R groups are hydrogen.

6. A process according to claim 1 wherein step (A) is carried out using water as solvent.

7. A process for preparing a perylene pigment composition according to claim 1 wherein the compound of formula (II)

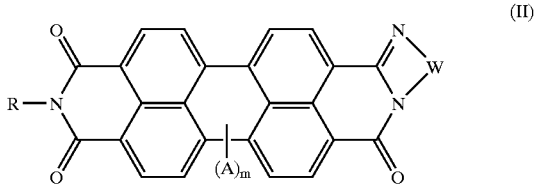

(II)

is prepared in a process comprising
(C) reacting
(i) a perylene tetracarboxylic compound having the formula (III)

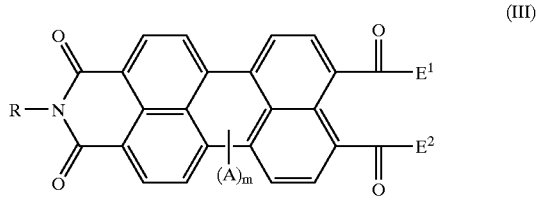

(III)

wherein
$E^1$ and $E^2$ are independently $OR^1$ or together are O, each $R^1$ is independently $C_1$–$C_6$ alkyl, $C_7$–$C_{16}$ aralkyl, or $C_6$–$C_{10}$ aryl,
(ii) about 100 to 300 mol % based on the total amount of (C)(i) of a diamine having the formula (IV), $H_2N$—W—$NH_2$          (IV)

wherein W is $C_2$–$C_3$ alkylene that is optionally substituted or modified, and
(iii) optionally, a solvent; and
(D) isolating the perylene dicarboxamidine imide intermediate.

8. A process according to claim 7 wherein $E^1$ and $E^2$ together are an oxygen atom.

9. A process according to claim 7 wherein W is 1,3-diamino-propane or 1,3-diaminopropane substituted in the 2-position with one or two $C_1$–$C_6$ alkyl groups or a hydroxy group.

10. A process according to claim 7 wherein the amount of component C (ii) is about 150 to 300 mol %.

11. A process according to claim 7 wherein R is $C_1$–$C_6$ alkyl.

12. A process according to claim 7 wherein m is zero.

13. A process according to claim 7 wherein step (C) is carried out using water as solvent.

* * * * *